May 31, 1927.
P. J. PAULY
COMPOSITE STEEL BAR
Filed May 16, 1925
1,630,631
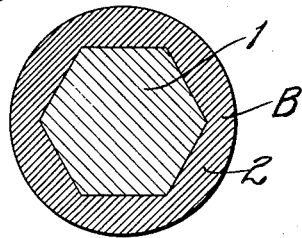
Fig.1.
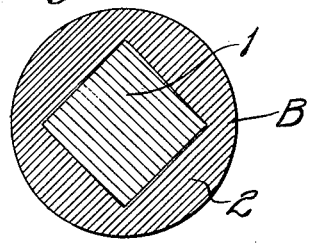
Fig.2.
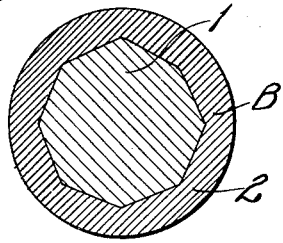
Fig.3.
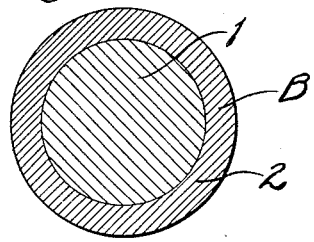
Fig.4.
Fig.6.
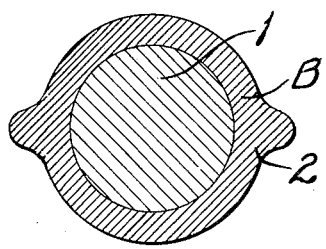
Fig.5.
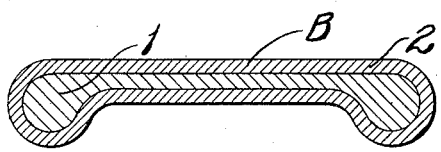
INVENTOR
PETER J. PAULY
BY Harry A. Benner
ATTORNEY Patented May 31, 1927.

1,630,631

UNITED STATES PATENT OFFICE.

PETER J. PAULY, OF ST. LOUIS, MISSOURI, ASSIGNOR TO PAULY JAIL BUILDING COMPANY, OF ST. LOUIS, MISSOURI, A CORPORATION OF MISSOURI.

COMPOSITE STEEL BAR.

Application filed May 16, 1925. Serial No. 30,818.

My invention has relation to improvements in composite steel bars and consists in the novel features of construction more fully set forth in the specification and pointed out in the claim.

Heretofore composite bars have been made which consisted of a comparatively soft core encased in a carbon steel shell of considerable hardness. However, bars of this type were not satisfactory for jail use because their hardness could be readily drawn with the application of moderate heat for thirty minutes or less. Air-hardening solid steel bars do not possess the disadvantages of the composite bar just alluded to, but they are difficult to fabricate and very costly. Superior to either of the above for practical purposes is a soft steel bar containing within it a portion composed of air-hardening manganese steel; such as described in U. S. Patent No. 1,005,142 issued to Robt. C. Becker of Pittsburgh, Pa.

However, even the composite bar of Patent No. 1,005,142 is not entirely satisfactory because the outer portions of soft steel may be removed with a saw, and the bar thus whittled away to a point where its strength is greatly reduced.

In order to overcome this last named disadvantage as well as the other defects named above I have provided a composite bar wherein the mild, or soft, steel is entirely encased in a protective shell of self-hardening steel. The bulk of the bar is made up of a core of soft steel entirely around which is cast a sheath or protective layer of manganese or other self-hardening steel.

The object of this composition is to provide a bar that possesses greater tensile strength than the ordinary bar, is comparatively easy to fabricate, and the temper of which cannot be drawn or destroyed. Further advantages will be better apparent from a detailed description of the invention in connection with the accompanying drawings, in which—

Figure 1 represents a cross-section taken through my improved bar of which the center or core consists of a hexagonal soft steel bar; Figs. 2, 3 and 4 are similar sections through bars having square, octagonal, and circular cores; Fig. 5 is a cross-sectional view taken through a flat bar having rounded edges; and Fig. 6 is a cross-sectional view through a bar having a circular core and oppositely disposed lateral ridges.

Referring to the drawings, B represents my improved bar having a core 1 of ordinary soft steel around which is cast a layer or sheath 2 of self-hardening steel, i. e., steel which requires no special hardening treatment. The composition of the sheath 2 may vary greatly; the self-hardening properties may be due merely to the presence of manganese in proper proportion, or there may also be included a limited amount of tungsten.

Having described my invention, I claim:

A composite steel bar comprising an inner core and an outer sheath, said core constituting the bulk of the bar and consisting of mild steel, and the sheath consisting of self hardening non-annealable manganese steel.

In testimony whereof I hereunto affix my signature.

PETER J. PAULY.